(12) United States Patent
Karonde et al.

(10) Patent No.: US 10,114,847 B2
(45) Date of Patent: *Oct. 30, 2018

(54) CHANGE CAPTURE PRIOR TO SHUTDOWN FOR LATER BACKUP

(75) Inventors: Pratap Karonde, Holbrook, NY (US); Prashant Parikh, Holtsville, NY (US)

(73) Assignee: CA, Inc., New York, NY (US)

( * ) Notice: Subject to any disclaimer, the term of this patent is extended or adjusted under 35 U.S.C. 154(b) by 600 days.

This patent is subject to a terminal disclaimer.

(21) Appl. No.: 12/897,473

(22) Filed: Oct. 4, 2010

(65) Prior Publication Data

US 2012/0084258 A1    Apr. 5, 2012

(51) Int. Cl.
*G06F 7/00* (2006.01)
*G06F 17/30* (2006.01)
*G06F 11/14* (2006.01)

(52) U.S. Cl.
CPC .... *G06F 17/30348* (2013.01); *G06F 11/1461* (2013.01); *G06F 17/30365* (2013.01); *G06F 17/30368* (2013.01); *G06F 17/30371* (2013.01)

(58) Field of Classification Search
CPC .................................................. G06F 17/30371
USPC ................................. 707/999.104, 609, 648
See application file for complete search history.

(56) References Cited

U.S. PATENT DOCUMENTS

| | | | |
|---|---|---|---|
| 5,111,413 A * | 5/1992 | Lazansky | G06F 17/5022 703/13 |
| 5,163,148 A | 11/1992 | Walls | |
| 5,924,102 A * | 7/1999 | Perks | G06F 17/30067 |
| 6,546,403 B1 * | 4/2003 | Carlson, Jr. | G06F 17/30445 |
| 6,799,189 B2 | 4/2004 | Huxoll | |
| 6,785,786 B1 | 8/2004 | Gold et al. | |
| 7,069,402 B2 | 6/2006 | Coulter et al. | |
| 7,178,061 B2 * | 2/2007 | Aasheim | G06F 3/0619 714/24 |
| 7,197,665 B2 | 3/2007 | Goldstein et al. | |
| 7,266,574 B1 | 9/2007 | Boudrie et al. | |
| 7,295,960 B2 * | 11/2007 | Rappaport | G06F 17/509 455/403 |
| 7,797,279 B1 | 9/2010 | Starling et al. | |
| 7,934,064 B1 | 4/2011 | Per et al. | |
| 8,037,032 B2 | 10/2011 | Pershin et al. | |
| 8,051,044 B1 | 11/2011 | Dyatlov et al. | |
| 8,069,320 B1 | 11/2011 | Per et al. | |
| 8,117,410 B2 | 2/2012 | Lu et al. | |
| 8,190,574 B2 | 5/2012 | Barnes et al. | |
| 8,615,489 B2 * | 12/2013 | Pershin | G06F 11/1451 703/21 |
| 8,677,491 B2 * | 3/2014 | Turbin | G06F 11/00 713/188 |

(Continued)

OTHER PUBLICATIONS

"U.S. Appl. No. 12/837,829, Response filed May 15, 2013 to Non Final Office Action dated Feb. 15, 2013", 9 pgs.
"U.S. Appl. No. 12/837,829, Final Office Action dated Sep. 3, 2013", 22 pgs.
"U.S. Appl. No. 12/837,829, Notice of Allowance dated Mar. 17, 2014", 8 pgs.
"U.S. Appl. No. 12/837,829, Response filed Feb. 28, 2014 to Non Final Office Action dated Sep. 3, 2013", 11 pgs.

(Continued)

*Primary Examiner* — Eliyah S Harper
(74) *Attorney, Agent, or Firm* — Gilliam IP PLLC

(57) ABSTRACT

A computer implemented method includes monitoring blocks of data on a storage device that are changing as the computer operates. On detecting a computer shut down event, a copy of changes to the monitored blocks are saved. Upon startup of the computer, a backup of the changed blocks of data is performed.

20 Claims, 8 Drawing Sheets

(56) References Cited

U.S. PATENT DOCUMENTS

| | | | |
|---|---|---|---|
| 8,700,363 B2* | 4/2014 | Heinzerling | G01C 21/20 703/2 |
| 8,793,217 B2 | 7/2014 | Karonde et al. | |
| 2003/0200480 A1 | 10/2003 | Beattie | |
| 2004/0078666 A1* | 4/2004 | Aasheim | G06F 3/0619 714/24 |
| 2004/0143428 A1* | 7/2004 | Rappaport | G06F 17/509 703/22 |
| 2004/0268068 A1 | 12/2004 | Curran et al. | |
| 2006/0064444 A1 | 3/2006 | Van Ingen et al. | |
| 2007/0083722 A1 | 4/2007 | Per et al. | |
| 2007/0112895 A1 | 5/2007 | Ahrens et al. | |
| 2007/0276885 A1 | 11/2007 | Valiyaparambil et al. | |
| 2008/0126722 A1 | 5/2008 | Korlepara | |
| 2008/0133613 A1* | 6/2008 | Werner et al. | 707/201 |
| 2008/0275923 A1* | 11/2008 | Haselton et al. | 707/204 |
| 2009/0307286 A1 | 12/2009 | Laffin | |
| 2010/0070747 A1* | 3/2010 | Iyigun et al. | 713/2 |
| 2010/0076934 A1* | 3/2010 | Pershin et al. | 707/640 |
| 2010/0280994 A1 | 11/2010 | Radon et al. | |
| 2010/0299312 A1* | 11/2010 | Suryanarayanan et al. | 707/645 |
| 2011/0218966 A1 | 9/2011 | Barnes et al. | |
| 2012/0016841 A1 | 1/2012 | Karonde et al. | |
| 2014/0337294 A1 | 11/2014 | Karonde et al. | |

OTHER PUBLICATIONS

"U.S. Appl. No. 14/444,050, Non Final Office Action dated Oct. 6, 2014", 20 pgs.

"U.S. Appl. No. 14/444,050, Notice of Allowance dated Apr. 29, 2015", 18 pgs.

"U.S. Appl. No. 14/444,050, Response filed Jan. 6, 2015 to Non Final Office Action dated Oct. 6, 2014", 9 pgs.

U.S. Appl. No. 12/837,829, Response filed Dec. 5, 2012 to Final Office Action dated Oct. 26, 2012, 10 pgs.

U.S. Appl. No. 12/837,829, Advisory Action dated Dec. 14, 2012, 3 pgs.

U.S. Appl. No. 12/837,829, Examiner Interview Summary dated May 7, 2013, 3 pgs.

U.S. Appl. No. 12/837,829, Examiner Interview Summary dated Dec. 4, 2012, 4 pgs.

U.S. Appl. No. 12/837,829, Final Office Action dated Oct. 26, 2012, 19 pgs.

U.S. Appl. No. 12/837,829, Non Final Office Action dated Feb. 15, 2013, 21 pgs.

U.S. Appl. No. 12/837,829, Non Final Office Action dated Apr. 2, 2012, 14 pgs.

U.S. Appl. No. 12/837,829, Response filed Jul. 2, 2012 to Non Final Office Action dated Apr. 2, 2012, 9 pgs.

* cited by examiner

CHANGE CAPTURE PRIOR TO SHUTDOWN FOR LATER BACKUP

BACKGROUND

When a computer system is up and running the data on the disk is in transient state. There are lots of changes happening to the data directly or indirectly because of user actions. After finishing the work when that computer system is shut down the data on the disk is typically in a state where backup is highly desired so that the system can be recovered back to that same state if something goes wrong with it. Since the machine is shut down user can perform an offline backup of all data by connecting the disks of the computer to other system. But this cannot be practically done every day. More desirable solution would be to automatically perform the backup of the machine when it is shut down every time. However back up of a machine can take potentially very long time and it would block the shutdown of the system for that long.

SUMMARY

A computer implemented method includes monitoring blocks of data on a storage device that are changing as the computer operates. On detecting a computer shut down event, a copy of changes to the monitored blocks are saved. Upon startup of the computer, a backup of the changed blocks of data is performed.

In one embodiment, a computer readable device stores instructions to cause a computer to perform the method.

In a further embodiment, a computer system includes a monitor to monitor blocks of data on a storage device that are changing as the computer operates. An event detector detects a computer shut down event. A storage device saves a copy of changes to the monitored blocks of data following detection of the shut down event. A backup module running on the computer system performs a backup of the changed blocks of data upon startup of the computer system.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
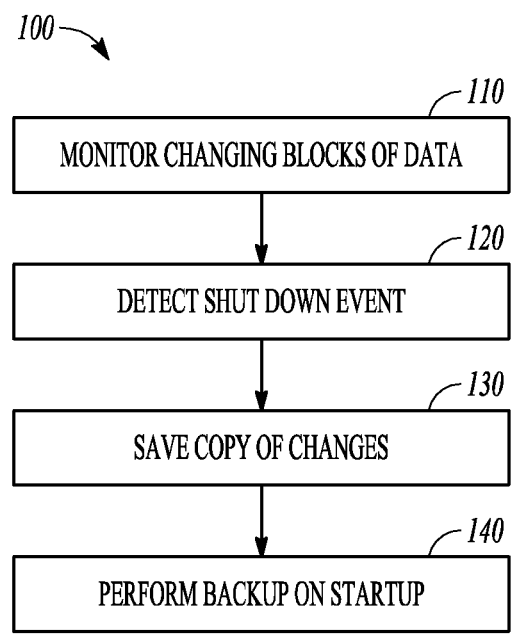
FIG. 1 is a flowchart diagram illustrating a backup program to save a copy of changes to blocks of data and perform a backup upon startup according to an example embodiment.

A computer implemented method 100 as shown in FIG. 1 in flowchart form may be implemented in a backup program that runs on a computer. The program may run on a computer having a storage device to be backed up, or may manage one or more storage devices coupled to the computer. At 110, the computer monitors blocks of data on the storage device that are changing as the computer operates. The computer is monitored to detect a computer shut down event at 120. Once a shut down even is detected, the program saves a copy of all changes to the monitored blocks of data at 130. This copy may be saved very quickly following detection of the shut down event. Upon startup of the computer, the program performs a backup of the changed blocks of data as indicated at 140.

In one embodiment, saving a copy of all the changes to the monitored blocks of data includes creating a snapshot such as by using a volume shadow copy service of the computer. Volume shadow copy services in one embodiment is a service such as that provided in a Microsoft Windows® operating system. Snapshots allow the creation of consistent backups of a volume, ensuring that the contents cannot be changed while the snapshot is being made. The snapshot may be point in time and application level consistent without the need for specific knowledge about the application program invoking the services. The snapshot allows any file to be retrieved as it existed at the time any snapshot was made. In one embodiment, the backup program is an application that tracked change data to be applied during a backup. The snapshot allows the backup to be made upon startup.

Figure 2:
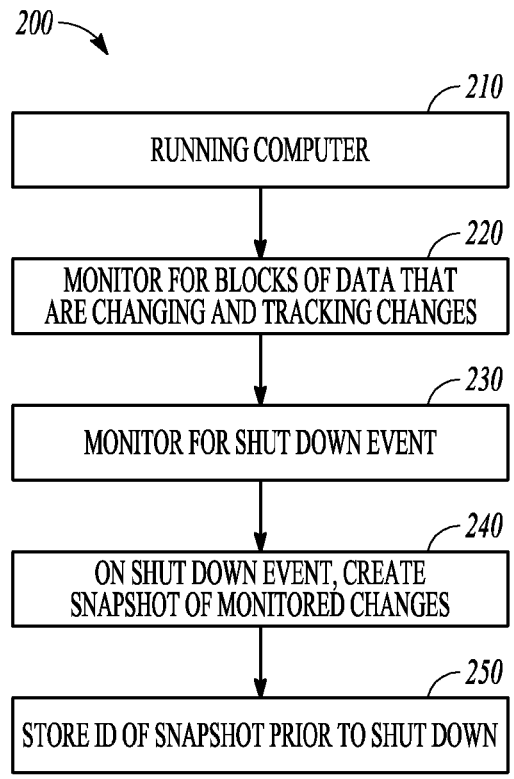
FIG. 2 is a flowchart diagram illustrating further details of a backup program to store a snapshot of monitored changes to blocks of data on detection of a shutdown even according to an example embodiment.

In one embodiment as illustrated in method 200 in FIG. 2, a running computer 210 is monitored for blocks of data that are changing at 220. When the data on the computer is changed, a back-up program keeps track of the changes so that corresponding blocks of data can be backed up when needed. Monitoring blocks of data that are changing in one embodiment includes tracking the changes in the backup program such that the changes are automatically stored in the snapshot. When the computer is being shut down the program detects a shut down event at 230 and uses a copy service, such as a volume shadow copy services of the computer to create a snapshot at 240. The snapshot captures all the changes that were made on the computer when it was running. The program stores an id of the snapshot at 250 on the disk before the computer is shut down.

Figure 3:
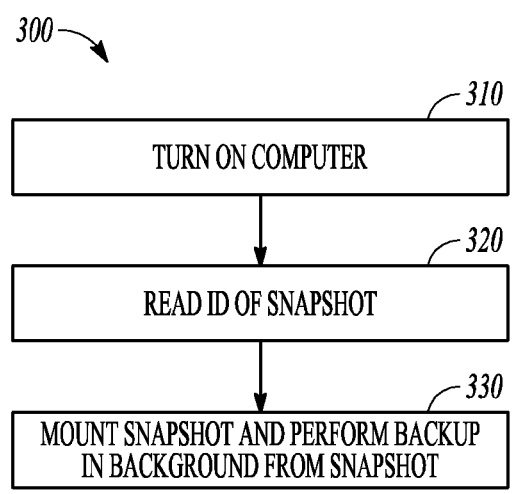
FIG. 3 is a flowchart diagram illustrating performing a backup from a snapshot according to an example embodiment.

A method 300 is illustrated in FIG. 3. When the computer is turned on again at 310, the back-up program reads the ID of the snapshot at 320, mounts the snapshot, and performs a backup of all the changed blocks at 330. In one embodiment, backup may be performed as a background task, while a user continues to use the system for other tasks. The user no longer has to perform offline backup of the machine by attaching disks to a different computer. In some embodiments, a system shut down is automatically detected, and the state of the system is stored. The snapshot is created very fast, minimally affecting the length of time it takes to shut down the system. The actual backup may be performed in the background when the system is turn on again.

The backup may take many different forms, such as incremental backups, complete backups, various levels of RAID, and other types of backups.

In one embodiment, the backups may be incremental backups. The incremental backups may be made periodically in one embodiment, and may be scheduled after a system has been shut down. In such a case, the incremental backup is run on startup from the snapshot data. If the next incremental backup is scheduled after the computer has been started up again, the backup may be run at the scheduled time, utilizing the snapshot data and further saved changes to data blocks. The incremental backups may or may not be merged as described below.

Figure 4:
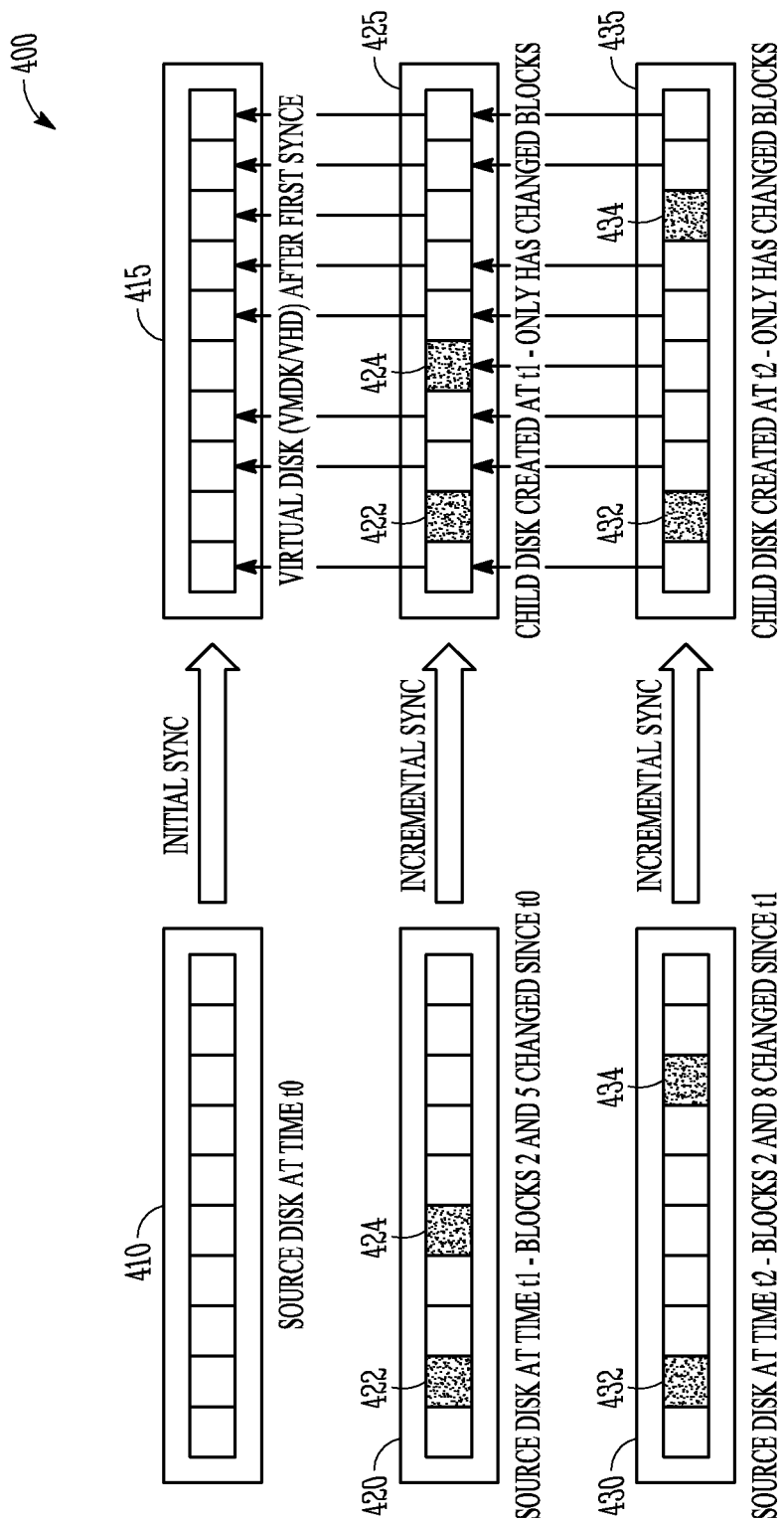
FIG. 4 is a diagram illustrating multiple backups of selected data over time according to an example embodiment.

FIG. 4 is a diagram illustrating at 400, multiple backups of selected data over time according to an example embodiment. A bock representation of a data storage device at a time T0 is indicated at 410. Ten blocks are shown as representing data stored on the data storage device 410. In one embodiment, data stored on the storage device 410 is broken into blocks as shown. Portions of the storage device 410 that do not currently have data need not have a corresponding block. An initial full backup of the blocks is performed and results in a backup copy 415 of the blocks, which may be stored on a virtual disk, or any other type of container or storage device, such as a disk drive. All ten blocks are stored in full backup copy 415. The initial backup may be referred to as an initial sync in one embodiment.

At a time T1, storage device 410 may be modified as shown at 420. Blocks 422 and 424, the second and fifth blocks may be changed from time T0. An incremental sync or backup is then performed, resulting in blocks 422 and 424 being stored as indicated at incremental backup 425. The same container or storage device used for backup copy 415 may also be used for incremental backups. The remaining blocks need not be stored in incremental backup 425, because they remain the same as stored in full backup copy 415.

At a time T2, more blocks of storage device 410 may have been modified as shown at 430. Blocks 432 and 434, corresponding to the second and eighth blocks have been modified. The second block was modified both by times T1 and T2. Both blocks 432 and 434 are stored in a further incremental backup 435. The other, unmodified blocks need not stored in incremental backup 435. Note that several blocks have not been modified yet, and are thus not included in the incremental backups 425 and 435. Many more incremental backups may be performed at set times or as otherwise desired.

At some point, to reduce the number of incremental backups that must be processed to recover data, the two oldest backups, 415 and 425 may be optionally merged. Merging results in block 422 in backup 425 being stored over the second block in backup 415, and block 424 in backup 425 being stored over the fifth block in backup 415. The overall number of backups is reduced by as a result of the merge, making recovery shorter, as fewer backups need to be processed to recover data.

Figure 5:
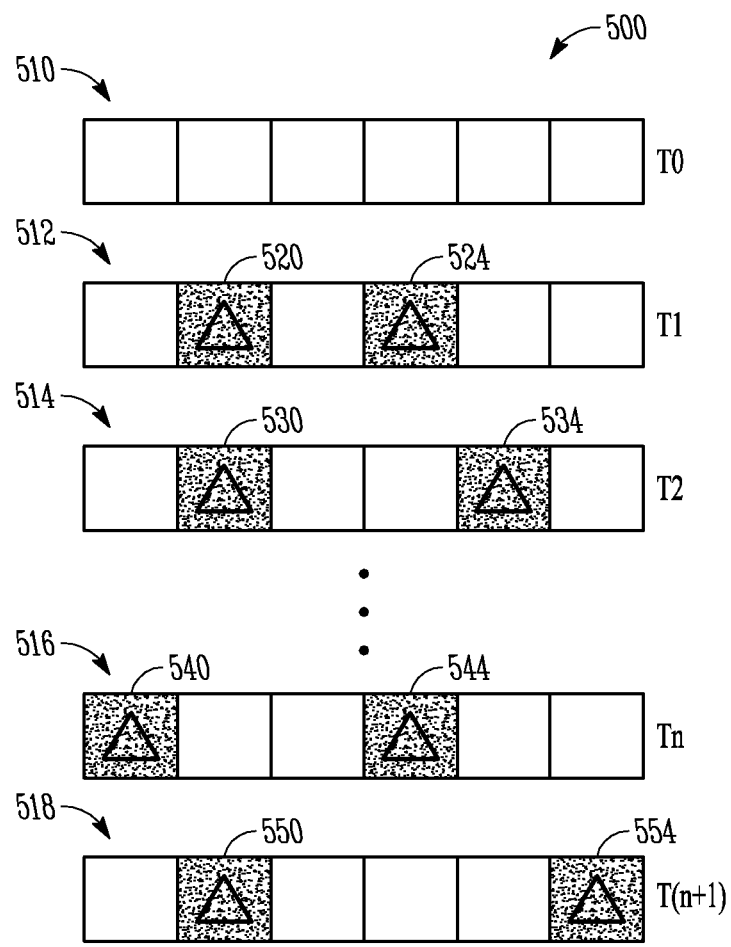
FIG. 5 is a flowchart illustrating a process of making multiple incremental backups over time according to an example embodiment.

FIG. 5 is a diagram illustrating at 500, multiple backups of selected data over time according to an example embodiment. A bock representation of a full backup of blocks of data storage device at a time T0 is indicated at 510, and successive incremental backups are shown at 512 for time T1, 514 for time T2, 516 for time Tn, and 218 for time T(n+1). In one embodiment, only changed blocks in the incremental backups are saved. The changed blocks are indicated at 520 and 524 for incremental backup 512, 530 and 534 for incremental backup 514, 540 and 544 for incremental backup 516, and 550 and 554 for incremental backup 518.

In one embodiment, n incremental backups are kept. When incremental backup 518 is made or is scheduled to be made, the changed blocks 520 and 534 of incremental backup 512 are merged into the full backup 510, replacing corresponding blocks. The merging of the two oldest backups, 510 and 512 ensure that at most only n backups need be merged to recover data prior to a next backup. When incremental backup at time T(n+2) is to be performed, incremental backup 514 from time T2 may be merged into full backup 510, maintaining the number of backups at n. This process may continue ad infinitum, without the need to make a second full backup, saving storage space, and recovery time.

As one example, consider that the storage device needs to be recovered after time T(n+1). With the previous merger of incremental backup 512, only n backups need to be processed to recover data that had been stored on the storage device. At time T(n+m), the mergers reduce by m the number of backups to be processed to recover the data. Over time, m, can be very large, such 1000 or more if backups are scheduled periodically. In some embodiments, scheduled backups may be set by users, and may be performed several times week, day or hour as desired, resulting in very large numbers of incremental backups if merges are not performed. However, mergers help keep the number of backups to be processed to recover data to a manageable number.

In some embodiments, rather than a fixed number, n, of incremental backups being kept, backups may instead be merged based on time periods. For instance, a user may desire to keep all incremental backups for a period of a week, or some other user selected period. Rather than merging the oldest two backups, intermediate incremental backups may be merged, such as to merge daily backups into weekly backups that may be kept for a longer period of time. Regardless of the incremental backup rate, incremental backups may be merged when they are older than the selected period. They may be merged in batch, so that they may occur at slow periods, such as late evenings or early mornings in one embodiment, or individually as the selected period for each incremental backup is past.

Figure 6:
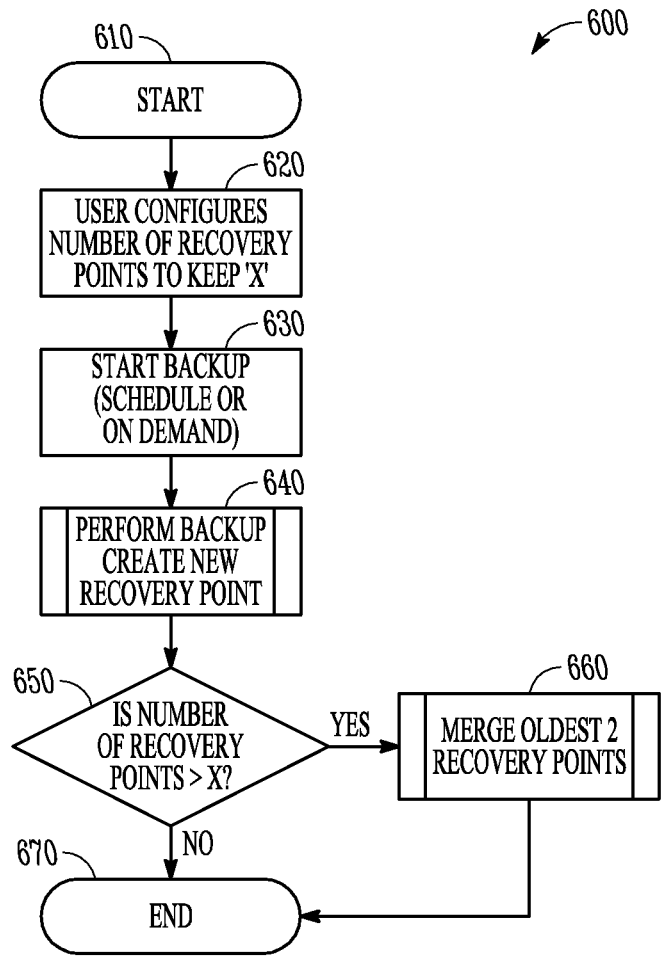
FIG. 6 is a flowchart illustrating a computer implemented process for backing up data according to an example embodiment.

FIG. 6 is a flowchart illustrating a computer implemented process 600 for backing up data. At 610, the process 600 starts. The process may be set up on a new computer system or an older computer system, and operates to backup data stored on one or more storage devices to allow users to recover data that may be lost due to equipment failure or other event leading to data loss.

At 620, a user configures the number of recovery points, x, to keep. The number may be a default number set by a manufacturer, or may be selected to allow recovery to selected points within a desired time frame, such as a few days or weeks, or even minutes depending on the frequency of backups and the application being implemented by the computer system. Once the number of recovery points is selected backups may be started as indicated at 630. Backups may be scheduled periodically, or on demand, or a combination of both.

At 640, a backup is performed, creating a new recovery point. The initial backup is referred to as the oldest recovery point, with subsequent backups being referred to as incremental recovery points. At 650, the number of recovery points is checked to see if it is greater than x. If so, the oldest two recovery points are merged at 660, creating an updated oldest recovery point. The process 600 ends at 670.

Figure 7:
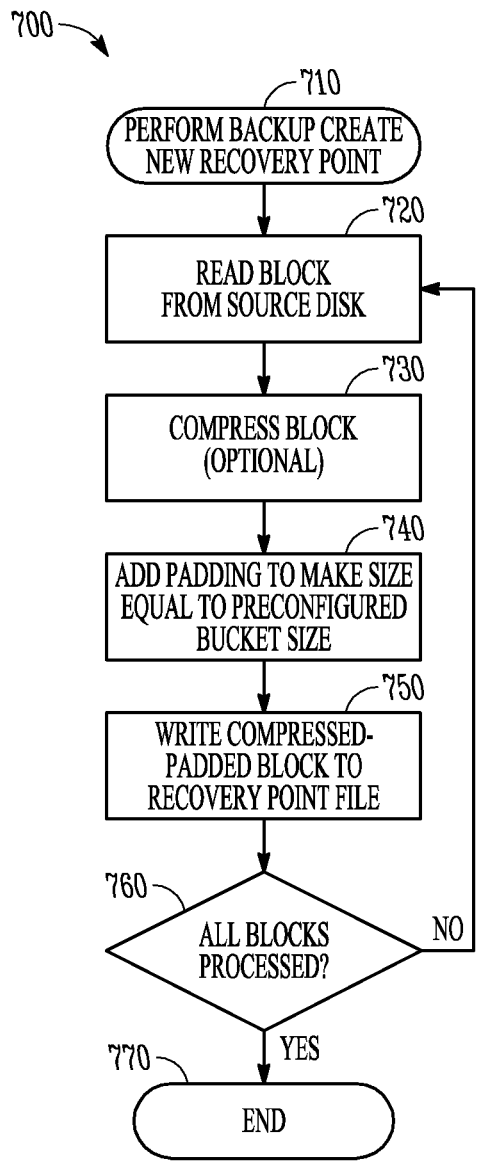
FIG. 7 is a flowchart illustrating a process of creating a new or first recovery point according to an example embodiment.

FIG. 7 is a flowchart illustrating a process 700 of creating a new or first recovery point. At 710, a backup is initiated to create a new recovery point. At 720, a block from a source storage device, such as a disk of a disk drive device is read. At 730, the block may be optionally compressed. At 740, some padding is added to the block to make the size of the block equal to a preconfigured bucket size or one of several preconfigured sizes. At 750, the padded block, or padded compressed block is written to a recovery point file on a backup storage system, such as different disk drives, tape drives, optical, or other type of storage. At 760, it is determined whether all the blocks have been processed. If not, the next block is read at 720, and the process 700 continues. If all blocks have been processed, process 700 ends at 770.

Figure 8:
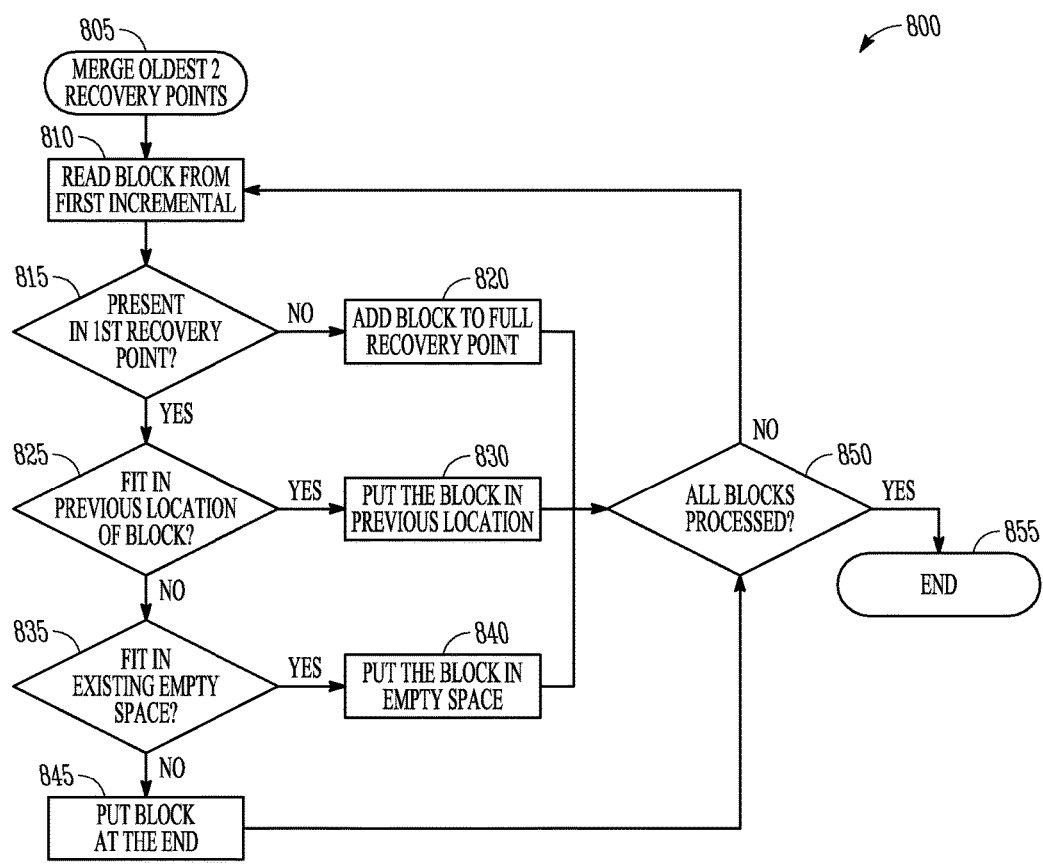
FIG. 8 is a flowchart illustrating a process for merging recovery points according to an example embodiment.

FIG. 8 is a flowchart illustrating a process 800 for merging recovery points. At 805, the process to merge the oldest two recovery points begins. At 810, a block is read from the first incremental recovery point. At 815, a check is made to see if the read block is present in the oldest, first recovery point. If not, the read block is added to a full recovery point at 820. If the read block was present, a check is made at 825 to determine if the read block will fit in the previous location of the block in the first recovery point. The padding provides some buffer to increase the likelihood that the read block will fit, even if the data in the block has been significantly changed. If it will fit, the block is put into the previous location at 830, if not, a check is made to see if the read block will fit in existing empty space at 835. If the block will fit in existing empty space, the block is put into the empty space at 840. If not, the block may be added to the end of the recovery point at 845. After the read block is stored at 820, 830, or 840, a check is made to see if all blocks have been processed at 850. If not, the merger process proceeds at 810 by reading a next block. If all blocks have been processed, the merge process 800 ends at 855.

Figure 9:
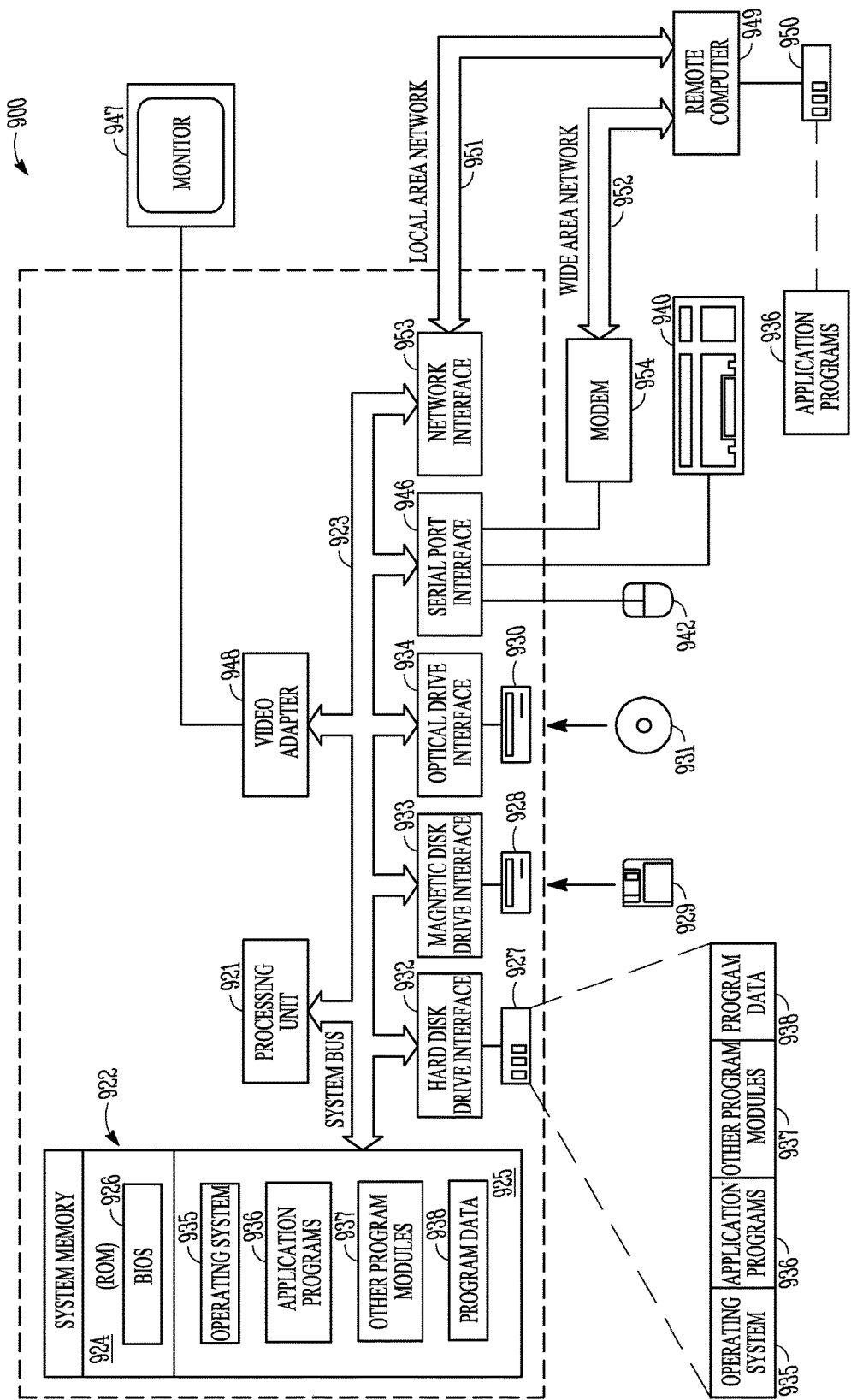
FIG. 9 is a block diagram illustrating a computer system for implementing and full backup and multiple incremental backups according to an example embodiment.

In the embodiment shown in FIG. 9, a hardware and operating environment is provided that is applicable to any of the servers and/or remote clients shown in the other Figures.

As shown in FIG. 9, one embodiment of the hardware and operating environment includes a general purpose computing device in the form of a computer 900 (e.g., a personal computer, workstation, or server), including one or more processing units 921, a system memory 922, and a system bus 923 that operatively couples various system components including the system memory 922 to the processing unit 921. There may be only one or there may be more than one processing unit 921, such that the processor of computer 900 comprises a single central-processing unit (CPU), or a plurality of processing units, commonly referred to as a multiprocessor or parallel-processor environment. In various embodiments, computer 900 is a conventional computer, a distributed computer, or any other type of computer.

The system bus 923 can be any of several types of bus structures including a memory bus or memory controller, a peripheral bus, and a local bus using any of a variety of bus architectures. The system memory can also be referred to as simply the memory, and, in some embodiments, includes read-only memory (ROM) 924 and random-access memory (RAM) 925. A basic input/output system (BIOS) program 926, containing the basic routines that help to transfer information between elements within the computer 900, such as during start-up, may be stored in ROM 924. The computer 900 further includes a hard disk drive 927 for reading from and writing to a hard disk, not shown, a magnetic disk drive 928 for reading from or writing to a removable magnetic disk 929, and an optical disk drive 930 for reading from or writing to a removable optical disk 931 such as a CD ROM or other optical media.

The hard disk drive 927, magnetic disk drive 928, and optical disk drive 930 couple with a hard disk drive interface 932, a magnetic disk drive interface 933, and an optical disk drive interface 934, respectively. The drives and their associated computer-readable media provide non volatile storage of computer-readable instructions, data structures, program modules and other data for the computer 900. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 929, optical disk 931, ROM 924, or RAM 925, including an operating system 935, one or more application programs 936, other program modules 937, and program data 938. Programming for implementing one or more processes or method described herein may be resident on any one or number of these computer-readable media.

A user may enter commands and information into computer 900 through input devices such as a keyboard 940 and pointing device 942. Other input devices (not shown) can include a microphone, joystick, game pad, satellite dish, scanner, or the like. These other input devices are often connected to the processing unit 921 through a serial port interface 946 that is coupled to the system bus 923, but can be connected by other interfaces, such as a parallel port, game port, or a universal serial bus (USB). A monitor 947 or other type of display device can also be connected to the system bus 923 via an interface, such as a video adapter 948. The monitor 947 can display a graphical user interface for the user. In addition to the monitor 947, computers typically include other peripheral output devices (not shown), such as speakers and printers.

The computer 900 may operate in a networked environment using logical connections to one or more remote computers or servers, such as remote computer 949. These logical connections are achieved by a communication device coupled to or a part of the computer 900; the invention is not limited to a particular type of communications device. The remote computer 949 can be another computer, a server, a router, a network PC, a client, a peer device or other common network node, and typically includes many or all of the elements described above I/O relative to the computer 900, although only a memory storage device 950 has been illustrated. The logical connections depicted in FIG. 9 include a local area network (LAN) 951 and/or a wide area network (WAN) 952. Such networking environments are commonplace in office networks, enterprise-wide computer networks, intranets and the internet, which are all types of networks.

When used in a LAN-networking environment, the computer 900 is connected to the LAN 951 through a network interface or adapter 953, which is one type of communications device. In some embodiments, when used in a WAN-networking environment, the computer 900 typically includes a modem 954 (another type of communications device) or any other type of communications device, e.g., a wireless transceiver, for establishing communications over the wide-area network 952, such as the internet. The modem 954, which may be internal or external, is connected to the system bus 923 via the serial port interface 946. In a networked environment, program modules depicted relative to the computer 900 can be stored in the remote memory storage device 950 of remote computer, or server 949. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. § 1.72(b) is submitted with the understanding that it will not be used to interpret or limit the scope or meaning of the claims.

What is claimed is:

1. A computer implemented method comprising:
monitoring, using an application, blocks of data on a storage device that are changing as a computer operates;
creating a plurality of incremental backups, wherein each incremental backup includes only blocks of data of the monitored blocks of data that have changed since a previous incremental backup;
merging, using the application, two oldest incremental backups of the plurality of incremental backups in response to a number of incremental backups exceeding a specified number;
detecting that the computer is being shut down;
in response to detecting that the computer is being shut down, saving a copy of a shutdown incremental backup to the storage device before the computer is shut down, wherein the shutdown incremental backup includes blocks of data of the monitored blocks of data that have changed since the most recent incremental backup of the plurality of incremental backups; and
upon startup of the computer, transmitting, using the application, the blocks of data included in the shutdown incremental backup to a backup storage device.

2. The computer implemented method of claim 1, wherein saving a copy of the shutdown incremental backup comprises creating a snapshot.

3. The computer implemented method of claim 2, wherein the snapshot is created using a volume shadow copy service of the computer.

4. The computer implemented method of claim 2 further comprising storing an identifier of the snapshot on the storage device in response to detecting that the computer is being shut down.

5. The computer implemented method of claim 4 further comprising reading the identifier of the snapshot upon startup of the computer.

6. The computer implemented method of claim 1, wherein transmitting, using the application, the blocks of data included in the shutdown incremental backup is performed as a background task of the computer.

7. A computer system comprising:
a storage device;
a processor; and
a non-transitory machine-readable medium having program code executable by the processor to cause the computer system to:
monitor blocks of data on the storage device that are changing as the computer system operates;
periodically create an incremental backup, wherein each incremental backup includes only blocks of data of the monitored blocks of data that have changed since a previous incremental backup;
merge two oldest incremental backups in response to a number of incremental backups exceeding a specified number;
detect that the computer system is being shut down;
in response to detection of the computer system being shut down, save a copy of a shutdown incremental backup before the computer system is shut down, wherein the shutdown incremental backup includes blocks of data of the monitored blocks of data that have changed since the most recent incremental backup; and
upon startup of the computer system, transmit the blocks of data included in the shutdown incremental backup to a backup storage device.

8. The computer system of claim 7, wherein the program code executable by the processor to cause the computer system to save the copy of the shutdown incremental backup comprises program code executable by the processor to cause the computer system to create a snapshot.

9. The computer system of claim 8, wherein the snapshot is created using a volume shadow copy service running on the computer system.

10. The computer system of claim 8 further comprising program code executable by the processor to cause the computer system to store an identifier of the snapshot on the storage device in response to a detection that the computer system is being shut down.

11. The computer system of claim 10 further comprising program code executable by the processor to cause the computer system to read the identifier of the snapshot upon startup of the computer system.

12. A non-transitory computer readable storage medium having instructions stored thereon, the instructions to:
monitor blocks of data on a storage device that are changing as a computer operates;
periodically create an incremental backup, wherein each incremental backup includes only blocks of data of the monitored blocks of data that have changed since a previous incremental backup;

merge two oldest incremental backups in response to a number of incremental backups exceeding a specified number;

detect that the computer is being shut down;

in response to detection of the computer being shut down, save a copy of a shutdown incremental backup to the storage device before the computer is shut down, wherein the shutdown incremental backup includes blocks of data of the monitored blocks of data that have changed since the most recent incremental backup; and upon startup of the computer, transmit the blocks of data included in the shutdown incremental backup to a backup storage device.

13. The computer readable storage medium of claim 12, wherein the instructions to save the copy of the shutdown incremental backup comprises instructions to create a snapshot, wherein the snapshot is created using a volume shadow copy service of the computer.

14. The computer readable storage medium of claim 13 further comprising instructions to:

store an identifier of the snapshot on the storage device in response to a detection that the computer is being shut down; and read the identifier of the snapshot upon startup of the computer.

15. The computer readable storage medium of claim 12, wherein the instructions to transmit the blocks of data included in the shutdown incremental backup comprise instructions to transmit the blocks of data included in the shutdown incremental backup as a background task of the computer.

16. The computer system of claim 7, wherein the program code executable by the processor to cause the computer system to transmit the blocks of data included in the shutdown incremental backup comprises program code executable by the processor to cause the computer system to transmit the blocks of data included in the shutdown incremental backup as a background task of the computer system.

17. The method of claim 1 further comprising:

upon startup of the computer, determining whether the shutdown incremental backup is older than a time period; and in response to a determination that the shutdown incremental backup is older than the time period, merging the shutdown incremental backup with incremental backups of the plurality of incremental backups that are older than the time period.

18. The method of claim 1 further comprising:

upon startup of the computer, determining whether any of the monitored blocks of data changed during the startup of the computer; and in response to a determination that at least some of the monitored blocks of data changed and prior to transmitting the shutdown incremental backup, updating the shutdown incremental backup with the monitored blocks of data which changed.

19. The system of claim 7 further comprising program code executable by the processor to cause the computer system to:

upon startup of the computer, determine that the shutdown incremental backup is older than a time period; and in response to a determination that the shutdown incremental backup is older than the time period, merge the shutdown incremental backup with incremental backups that are older than the time period.

20. The system of claim 7 further comprising program code executable by the processor to cause the computer system to:

upon startup of the computer, determine that at least some of the monitored blocks of data changed during the startup of the computer; and in response to a determination that at least some of the monitored blocks of data changed and prior to transmission of the shutdown incremental backup, update the shutdown incremental backup with the monitored blocks of data which changed.

* * * * *